United States Patent [19]

Holmes et al.

[11] Patent Number: 4,747,440
[45] Date of Patent: May 31, 1988

[54] PNEUMATIC TIRE AND WHEEL RIM ASSEMBLIES

[75] Inventors: Thomas Holmes; William S. Udall, both of Birmingham, England

[73] Assignee: Dunlop Limited a British Company, United Kingdom

[21] Appl. No.: 487,134

[22] Filed: Apr. 21, 1983

[30] Foreign Application Priority Data

Apr. 21, 1982 [GB] United Kingdom ................ 8211579

[51] Int. Cl.$^4$ .................... B60C 17/00; B60C 15/024; B60C 15/04
[52] U.S. Cl. ................................ 152/516; 152/379.3; 152/381.3; 152/540; 152/544; 245/1.5
[58] Field of Search ........... 152/539, 540, 544, 378 R, 152/379.5, 381.3, 379.3, 379.4, 152, 165, 155, 379.1, 379.2, 381.1, 381.2, 516; 245/1.5

[56] References Cited

U.S. PATENT DOCUMENTS

| | | | |
|---|---|---|---|
| 1,503,883 | 4/1922 | Cobb | 152/540 |
| 3,736,974 | 6/1973 | LeJeune | 152/540 |
| 3,949,800 | 4/1976 | LeJeune | 152/540 |
| 4,148,348 | 4/1979 | French et al. | 152/379.3 |
| 4,166,492 | 9/1979 | Pfeiffer | 152/540 |
| 4,237,954 | 12/1980 | Pommier | 152/544 |
| 4,260,006 | 4/1981 | Udall et al. | 152/544 |
| 4,274,466 | 6/1981 | French et al. | 152/381.3 |
| 4,290,471 | 9/1981 | Pfeiffer | 152/540 |
| 4,321,957 | 3/1982 | Hahn et al. | 152/544 |
| 4,351,382 | 9/1982 | Corner et al. | 152/544 |

FOREIGN PATENT DOCUMENTS

| | | |
|---|---|---|
| 467424 | 2/1974 | Australia . |
| 471801 | 9/1974 | Australia . |
| 2360731 | 6/1975 | Fed. Rep. of Germany . |
| 1042861 | 9/1966 | United Kingdom . |

Primary Examiner—Michael Ball
Assistant Examiner—Thomas Bokan
Attorney, Agent, or Firm—Stevens, Davis, Miller & Mosher

[57] ABSTRACT

A pneumatic tire and wheel rim assembly of the type in which the wheel rim has retention means engageable with at least one tire bead to retain the tire bead at its bead seat under the action of road generated forces tending to dislodge tire bead wherein bead retention is improved by providing said at least tire bead with a bead reinforcement which has substantial resistance to deformation in an axial direction yet retains sufficient flexibility to a radial direction normal thereto to allow tire fitting to a one-piece rim. Suitable bead reinforcements are those having an axial rigidity factor 'K' greater than 8.5 N.m$^2$.

13 Claims, 2 Drawing Sheets

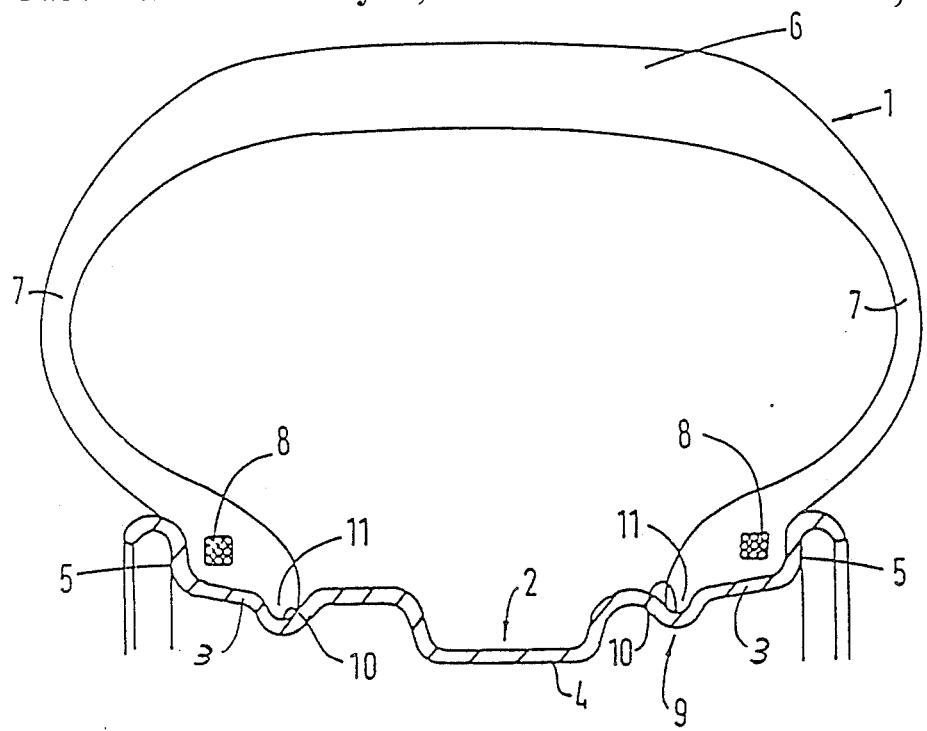
FIG.1
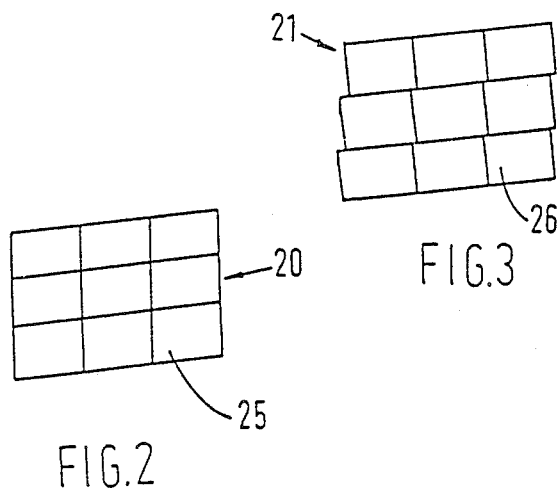
FIG.2
FIG.3

PNEUMATIC TIRE AND WHEEL RIM ASSEMBLIES

This invention concerns improvements in or relating to pneumatic tire and wheel rim assemblies.

In service the transmission of steering forces and the consequential road generated forces between the wheel rim and a tire mounted thereon is effected by the engagement of reinforced tire beads on rim bead seats. Retention of the tire beads on the rim bead seats is therefore essential for this purpose and in conventional pneumatic tire and wheel rim assemblies the rim bead seats are tapered and air inflation pressure forces the tire beads onto the taper whereby the tire beads are retained on the rim bead seats by a combination of the internal air pressure and the frictional restraint due to the compression of the elastomeric material of the tire bead below the inextensible bead reinforcement. Although the bead retention obtained thereby is acceptable when the assembly is operated at the normal service pressures it is known that in conditions where the tire is underinflated, thereby lowering the contribution to bead retention provided by the internal air pressure, dislodgement of one or both tire beads from its bead seat may occur, especially on application of a sideways steering force, and effective transmission of steering forces is reduced or prevented with consequent loss of control of the vehicle. Furthermore in the case of well-based wheel rims complete separation of the tyre from the wheel rim may occur with serious consequences to the vehicle and occupants.

Despite numerous proposals to solve the problem of bead dislodgement none provided an assembly having the advantages of one piece wheel rim with a well to allow mounting and removal of the tire for repair or replacement using conventional techniques without additional components such as well-fillers, bead spacers etc. until the present applicant's inventions the subject of UK Patent No. 1 584 553 (U.S. Pat. No. 4,148,348) and UK patent application No. 8038966 (published under No. 2 064 446A and as U.S. Pat. No. 4,351,382) in which the wheel rim is provided with retention means engageable with the tire bead such that under the action of road generated forces rotation of the tire bead about the retention means is effected in the contact patch so as to bring the tire bead toe under increasing compression and produce a reaction force which retains the tire bead at the bead seat by increasing the tension in the bead reinforcement and thereby overcoming the tendency for the tire bead to move down the taper of the bead seat.

Assemblies of the type disclosed in UK Patent No. 1 584 553 provide bead retention not only when the tire is underinflated but also when the tire is fully deflated i.e. zero inflation pressure, such as may occur following a puncture thereby providing a considerable improvement in safety over the conventional assemblies and the present invention is concerned with an improvement in assemblies of the type disclosed in UK Patent No. 1 584 553 which further improves the performance of the assembly and optionally enables a reduction in the size of the tire bead to be obtained.

According to the present invention a pneumatic tire and wheel rim assembly comprises a tire having a tread portion connected at each edge to a respective one of a pair of sidewalls each terminating at its radially inner edge in an annular tire bead, at least one bead having a substantially inextensible non-deformable internal bead reinforcement as herein defined, a one-piece wheel rim having a pair of axially spaced bead seats on each of which a respective one of the tire beads is seated, each bead seat being tapered in an axially and radially outwards direction with respect to the rotational axis of the rim and terminating at its axially outer edge in a respective tire bead retaining flange and bead retention means engageable with at least one tire bead such that under the action of road generated forces rotation of the tire bead about the retention means is effected to retain the tire bead at the bead seat.

As used herein the term non-deformable tire bead reinforcement defines a bead reinforcement which has substantial resistance to deformation in an axial direction but which is sufficiently deformable in a radial direction normal thereto to allow tire fitting to a one-piece wheel rim.

More particularly the substantial resistance to deformation in the axial direction is quantified by way of an axial rigidity factor 'K' and in accordance with the invention it is preferred that 'K' is greater than 8.5 $N.m^2$, more preferably greater than 9 $N.m^2$ and more preferably still greater than 20 $N.m^2$. The measurement of 'K' is described in more detail later.

It is believed that by using a non-deformable tire bead reinforcement rotation of the tire bead about the rotation means is effected over more than that portion of the tire bead which, as considered in the circumferential direction, is in the contact patch at any one time. As a result the reaction force generated due to increased compression of the tire bead toe acts over a greater circumferential portion of the tire bead than that generated in assemblies in which rotation is fully effective only in that portion of the tire bead which is in the contact patch at any one time. Consequently the bead retention is improved.

One type of non-deformable bead reinforcement is provided by a hoop preferably of metal which may be solid or hollow and may be formed by extrusion. Suitable bead reinforcements of this type are those disclosed in U.K. Patent No. 1,597,657 (U.S. Pat. No. 4,237,954 and Japanese Published Application No. 48,207/84. Another type of non-deformable bead reinforcement comprises an assembly formed by overlying turns of substantially inextensible strip material e.g. metal strip. The strip material may be flat or curved/bent so that successive turns nest one within the other. Suitable bead reinforcements of this type are those disclosed in U.K. Patent No. 1,042,861 and U.S. Pat. No. 4,321,957. More preferably however the non-deformable bead reinforcement comprises an assembly formed by turns of one or more wires constructed and arranged to prevent relative movement therebetween. Preferably the or each wire is of non-circular cross-section. Suitable bead reinforcements of this type are those disclosed in U.K. Patent Nos. 1,467,490 (U.S. Pat. No. 3,949,800) and 1,593,797 (U.S. Pat. No. 4,166,492), U.K. patent application No. 8005619 (Published under Serial No. 2,043,558A and as U.S. Pat. No. 4,305,769) and U.S. Pat. No. 4,290,471.

Not only is bead retention improved by the use of a non-deformable bead reinforcement as above-described but surprisingly we have found this improvement may be sufficiently great to enable a bead reinforcement of smaller cross-sectional area to be used than hitherto. This has a number of advantages. Firstly the amount of material in the bead reinforcement is reduced and secondly the overall size of the tire bead is reduced both of which provide a cost saving and contribute to a reduction in weight of the tire bead.

The bead retention means may comprise an annular groove in the rim adjacent to one or both bead seats in which an axially and radially inwardly extending toe of the associated tire bead is located as described in U.K. Patent No. 1,584,553. Alternatively the retention means may comprise a substantially continuous annular abutment at one or both bead seats and engageable with the toe of the associated tire bead as described in U.K. patent application No. 8038966 (U.S. Pat. No. 4,351,382).

Several embodiments of the invention will now be described in more detail, by way of example only, with reference to the accompanying drawings wherein:

FIG. 1 shows a schematic cross-sectional profile of a tire and wheel rim assembly incorporating the bead retention means the subject of U.K. Patent No. 1,584,553 (U.S. Pat. No. 4,148,348);

FIGS. 2 to 6 show in cross-section five constructions of non-deformable tire bead reinforcement;

Figure 4:
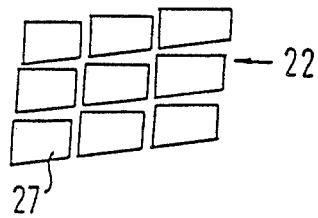
Figure 5:
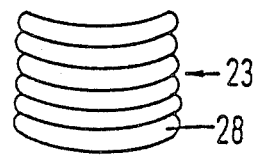
Figure 6:
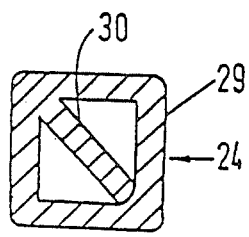

Referring first to FIG. 1 there is shown a pneumatic tire 1 and a one-piece wheel rim 2 assembly in which the wheel rim 2 has a pair of axially spaced tapered rim bead seats 3 separated by a tire fitting well 4 and terminating in radially outwardly directed bead retaining flanges 5 and the tire 1 has a reinforced tread 6 connected at each lateral edge to one of a pair of sidewalls 7 each of which terminates at the radially inner edge in a reinforced tire bead 8 seated on a respective bead seat 3. Bead retention means 9 is provided for each tire bead and comprises a respective circumferentially extending groove 10 formed in the rim 2 adjacent to each bead seat 3 in which a radially and axially inwardly extending toe 11 is located. A tire and wheel rim assembly as above-described forms the subject of U.K. Patent No. 1,584,553 to which the reader is directed for further information on the construction and operation of the assembly.

Referring now to FIGS. 2 to 6 these show five different constructions of non-deformable tire bead reinforcement 20, 21, 22, 23 and 24.

The bead reinforcements 20 and 21 are substantially similar being composed of wires 25 and 26 respectively of rectangular section (3 mm×1.5 mm) wound adjacent one another so as to form a closely packed 3×3 (strands×turns) construction of parallelogram cross-section. The lateral edges of corresponding wires in successive turns of the reinforcement 20 are vertically aligned whereas the lateral edges of corresponding wires in successive turns of the reinforcement 21 are slightly offset in the axial direction.

The bead reinforcement 22 is composed of wires 27 of trapezoidal section wound adjacent to one another so as to form a closely packed 3×3 (strands×turns) construction of parallelogram cross-section. The lateral edges of corresponding wires in successive turns are slightly offset in the axial direction.

The bead reinforcement 23 comprises six overlying spirally wound turns 28 of high tensile steel strip. The strip is of curved profile, the convex side being radially innermost so that successive turns rest one within the other and there is no tendency for the turns to move relative to one another in the axial sense.

The bead reinforcement 24 comprises a tubular metal hoop 29 of square cross-section having an internal diagonal reinforcing rib 30.

Each of the bead reinforcements 20, 21 and 22 is formed entirely from wire of non-circular cross-section, i.e. there is no rubber separating the individual windings, and has a very high inherent stability such that in use the individual windings are locked preventing relative movement therebetween. Likewise both the bead reinforcement 23 consisting of concentric turns 28 of metal strip in nesting relationship and the bead reinforcement 24 consisting of a tubular hoop 29 have a high inherent stability. As a result the reinforcements 20, 21, 22, 23 and 24 are substantially non-deformable in the axial direction but have sufficient flexibility in a radial direction normal thereto to change from their normal circular profile to an elliptical profile to allow tire fitting to a one-piece wheel rim using a fitting well.

Figure 7:
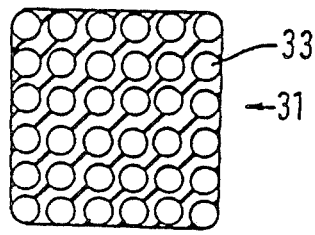
FIGS. 7 and 8 show in cross-section two constructions of deformable tire bead reinforcements.
Figure 8:
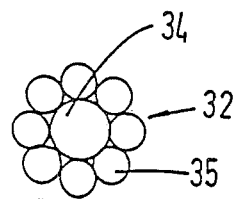

Referring now to FIGS. 7 and 8 these show a creel bead reinforcement 31 and a cable bead reinforcement 32. The creel bead reinforcement 31 is of rectangular section comprising wires 33 of circular section (diameter 0.965 mm) coated with rubber and wound adjacent one another to form a 6×6 (strands×turns) construction. Individual wires are separated by elastomer enabling the wires to move relative to one another. As a result the creel bead reinforcement is deformable in an axial direction to a greater extent than any of the above-described bead reinforcements 20, 21, 22, 23 and 24. The cable bead reinforcement 32 is of circular cross-section (diameter 6.6 mm) comprising a centre wire 34 (diameter 3 mm) and eight outer wires 35 (diameter 1.8 mm) wrapped around the centre wire to form a (1×3)+(8×1.8) construction. The outer wires 35 are able to rotate about the centre wire 34. As a result the cable bead reinforcement is deformable in an axial direction to a greater extent than any of the above-described bead reinforcements 20, 21, 22, 23 and 24.

Figure 9:
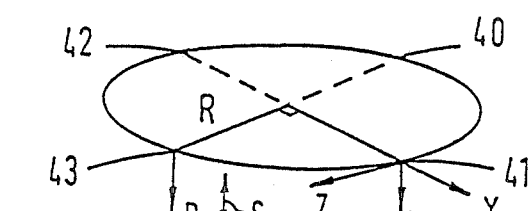
FIG. 9 shows the test method for determining the axial rigidity factor 'K' of a tire bead reinforcement.

The resistance to deformation in the axial direction of a tire bead reinforcement may be expressed in terms of an axial rigidity factor 'K'. The measurement of 'K' will now be described with reference to FIG. 9 which shows a tire bead reinforcement 40 of radius 'R' clamped at two diametrically opposed points 41, 42. If the clamped reinforcement is subjected to a force 'P' applied in the 'y' direction at a point 43 mid-way between clamped points 41, 42 a bending out-of-plane or axial deflection 'S' is produced which is a function of two properties of the reinforcement, viz. the flexural rigidity ($EI_x$) due to bending about the X-axis and the torsional rigidity (C) about the Z-axis. The relationship between these properties and 'R', 'P' and 'S' can be shown to be $$S = PR^3 \left( \frac{0.233}{EI_x} + \frac{0.0189}{C} \right) \qquad (1)$$

or $$\frac{PR^3}{S} = \frac{1}{\left( \frac{0.233}{EI_x} + \frac{0.0189}{C} \right)} \qquad (2)$$

$EI_x$ and C are dependent on the bead construction and by measuring P, R and S the axial rigidity factor 'K' of a given bead construction can be expressed as $K = PR^3/S$.

The following Table compares the dislodgement performance of two assemblies of the type shown in FIG. 1 each incorporating bead reinforcements of the type shown in FIG. 3 (non-deformable) and FIGS. 7 and 8 (deformable) respectively when fitted as the outer front wheel, i.e. left-hand or near side, in a right-hand J-turn test or vice versa and the axial rigidity factor 'K' of the bead reinforcements. The J-turn test comprises straight running at a constant speed and then the sudden application of full steering lock. The test is carried out with the tire at 0 p.s.i. inflation pressure, i.e. fully deflated and increasing the speed in 5 mph increments from 10 mph until dislodgement occurs.

TABLE

| TIRE | BEAD COIL CONSTRUCTION | DISLODGEMENT PERFORMANCE | 'K' N·m² calculated for P = 10 Newtons |
|---|---|---|---|
| 1. 200/60 HR390 | FIG. 3 - closed packed 3 × 3 rectangular wire (3 mm × 1.5 mm) 9 mmW 4.5 mmH | Not off 50 mph (further increase in speed to determine dislodgement not possible due to vehicle sliding on turning) | 25.0 |
| 2. 200/60 HR390 | FIG. 8 - cable (1 × 3 mm) + (8 × 1.8 mm) Dia 6.6 mm | Off at 20 mph | 6.3 |
| 3. 200/60 HR390 | FIG. 7 - creel 6 × 6 annular wire (diameter 0.965 mm) 11 mmW 10 mmH | Off at 45 mph | 8.5 |
| 4. 160/65 SR315 | FIG. 3 - close packed 2 × 2 rectangular wire (3 mm × 1.5 mm) 6 mmW 3 mmH | Not off at 50 mph (as for 1 above) | 9.1 |
| 5. 160/65 SR315 | FIG. 8 - cable (1 × 2.2 mm) + (9 × 1.4 mm) Dia 5.0 mm | Off at 20 mph | 2.0 |
| 6. 160/65 SR315 | FIG. 7 - creel 4 × 4 annular wire (diameter 0.965 mm) 7.5 mmW 6.0 mmH | Off at 25 mph | 2.8 |
| 7. 160/65 SR315 | FIG. 7 - creel 6 × 6 annular wire (diameter 0.965 mm) 8.7 mmW 9.0 mmH | Off at 40 mph | 6.8 |

A comparison of these results shows that for a given tire size the dislodgement performance of assemblies according to the present invention incorporating the non-deformable tire bead reinforcement of the type shown in FIG. 3 is significantly better than that of assemblies incorporating a deformable creel or cable bead reinforcement of the type shown in FIGS. 7 and 8. This improvement is also matched by a higher axial rigidity factor K for the bead reinforcements of assemblies according to the present invention which it is believed leads to the improved dislodgement performance obtained.

Having now described our invention, what we claim is:

1. A pneumatic tire and one-piece wheel rim assembly comprising a tire having a tread portion connected at each edge to a respective one of a pair of sidewalls each terminating at its radially inner edge in an annular tire bead, at least one of the tire beads having an extended toe and a single bead reinforcing hoop internal of each of said beads, said bead reinforcing hoop having substantial resistance to deformation in the axial direction with an axial rigidity factor "k" greater than 8.5 N.m², but which is sufficiently deformable in the radial direction to allow the fitting of the tire to the one piece rim, said one piece wheel rim having a pair of axially spaced bead seats on each of which a respective one of said tire beads is seated, each bead seat being tapered in an axially and radially outwards direction with respect to the rotational axis of said rim and terminating at its axially outer edge in a respective tire bead retaining flange and bead retention means, comprising a circumferentially extending groove in which the extended toe portion of the at least one bead is received such that under the action of road generated forces rotation of said tire bead about said retention means is effected while in engagement therewith to retain said tire bead at the bead seat.

2. An assembly according to claim 1 wherein the hoop of said at least one tire bead comprises an assembly formed by turns of at least one wire.

3. An assembly according to claim 2 wherein said assembly is formed by at least one wire of non-circular cross-section.

4. An assembly according to claim 1 wherein the hoop of said at least one tire bead comprises an assembly formed by over-lying turns of substantially inextensible strip material.

5. An assembly according to claim 4 wherein said strip material is of curved/bent profile and successive turns nest one within the other.

6. An assembly according to claim 1 wherein the bead reinforcing hoop is metal and formed by extrusion.

7. An assembly according to claim 1 wherein each tire bead has said extended toe and bead reinforcing hoop.

8. A pneumatic tire and wheel rim assembly comprising a tire having a tread portion connected at each edge to a respective one of a pair of sidewalls each terminating at its radially inner edge in an annular tire bead, each tire bead having a single substantially inextensible bead reinforcing hoop internal of each bead and having substantial resistance to deformation in the axial direction but which is sufficiently deformable in the radial direction to allow the fitting of the tire to said wheel rim, said wheel rim being a one-piece wheel rim having a pair of axially spaced bead seats on each of which a respective one of said tire beads is seated, each bead seat being tapered in an axially and radially outwards direction with respect to the rotational axis of said rim and terminating at its axially outer edge in a respective tire bead retaining flange and bead retention means engageable with at least one tire bead such that under the action of road generated forces rotation of said tire bead about the retention means while in engagement therewith is effected to retain said tire bead at the bead seat and the bead reinforcing hoop of said at least one tire bead has an axial rigidity factor 'K' greater than 8.5 N.m$^2$.

9. An assembly according to claim 8 wherein 'K' is greater than 9.0 N.m$^2$.

10. An assembly according to claim 9 wherein 'K' is greater than 20.0 N.m$^2$.

11. A pneumatic tire and wheel rim assembly comprising a tire having a tread portion connected at each edge to a respective one of a pair of sidewalls each terminating at its radially inner edge in an annular tire bead, each tire bead having a single substantially inextensible bead reinforcing hoop internal of the bead and having substantial resistance to deformation in the axial direction with an axial rigidity factor "K" greater than 8.5 N.m$^2$, but which is sufficiently deformable in the radial direction to allow the fitting of the tire to said wheel rim, said wheel rim being a one-piece wheel rim having a pair of axially spaced bead seats on each of which a respective tire bead is seated, each bead seat being tapered in an axially and radially outwards direction with respect to the rotational axis of said rim and terminating at its axially outer edge in a respective tire bead retaining flange and bead retention means engageable with at least one tire bead such that under the action of road generated forces rotation of said tire bead about the retention means while in engagement therewith is effected to retain said tire bead at the bead seat and said bead reinforcing hoop of said at least one tire bead comprises a plurality of turns of substantially inextensible material of non-circular cross-section.

12. An assembly according to claim 11 wherein said inextensible material comprises at least one wire of trapezoidal or rectangular cross-section.

13. An assembly according to claim 11 wherein said inextensible material comprises metal strip of curved/bent profile.

* * * * *